March 29, 1932.  O. M. SUMMERS  1,851,948
GASKET
Filed March 31, 1927   2 Sheets-Sheet 1
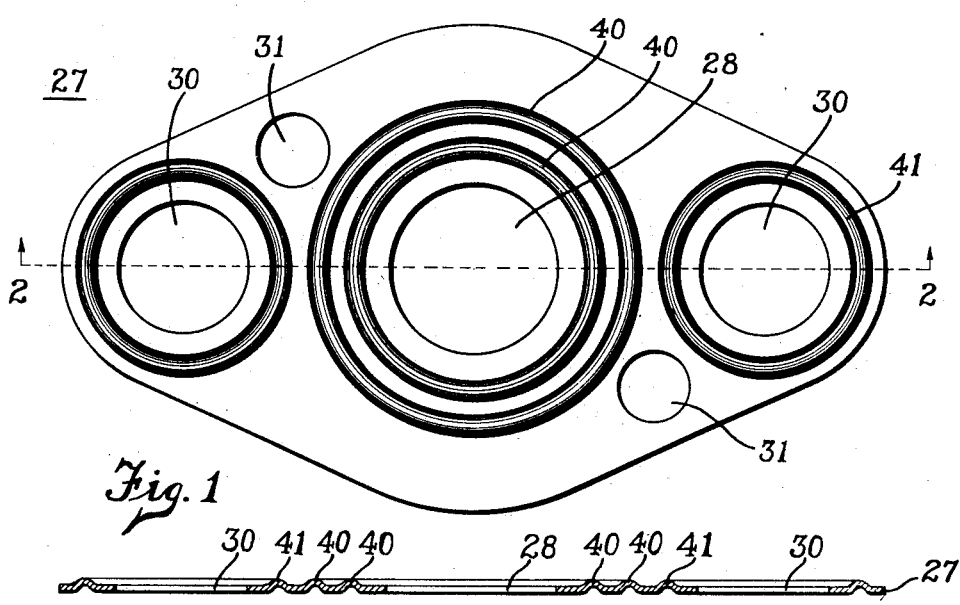
Fig. 1
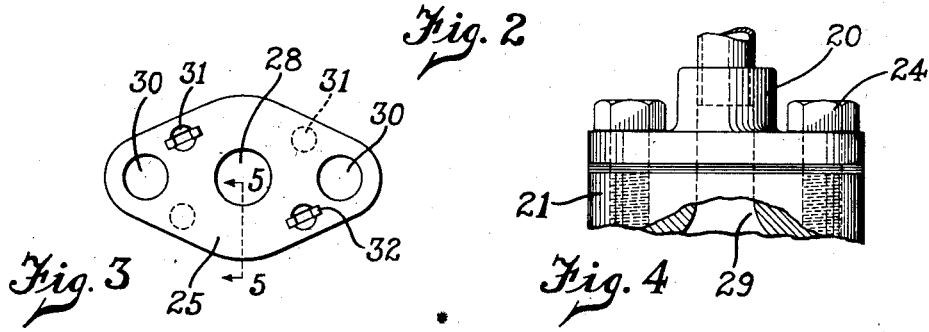
Fig. 2
Fig. 3   Fig. 4
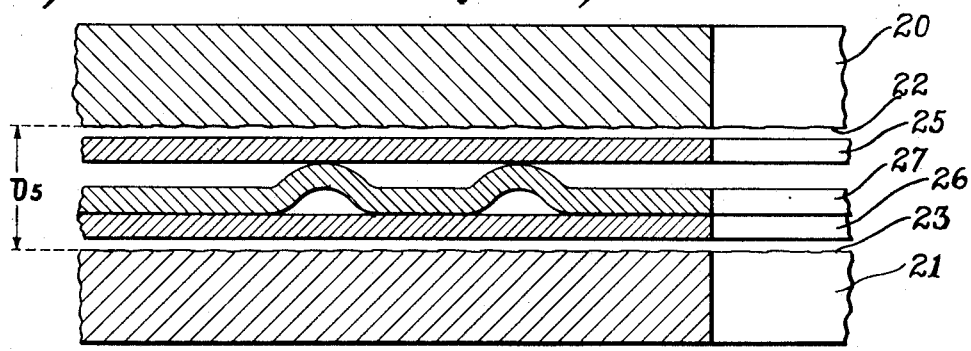
Fig. 5
Inventor
Otto M. Summers
By Spencer, Hardman & Fehr
Attorney March 29, 1932.　　　O. M. SUMMERS　　　1,851,948

GASKET

Filed March 31, 1927　　2 Sheets-Sheet 2

Inventor
Otto M. Summers
By Spencer Hardman & Zehr
Attorney

Patented Mar. 29, 1932

1,851,948

UNITED STATES PATENT OFFICE

OTTO M. SUMMERS, OF DAYTON, OHIO, ASSIGNOR, BY MESNE ASSIGNMENTS, TO FRIGIDAIRE CORPORATION, A CORPORATION OF DELAWARE

GASKET

Application filed March 31, 1927. Serial No. 179,964.

This invention relates to devices for sealing joints between surfaces particularly to gaskets for making a fluid-tight joint between conduits or other hollow bodies.

It is among the objects of the invention to provide a gasket having improved sealing properties, particularly at high pressures, to provide means for readily joining bodies or surfaces which are comparatively rough, and to provide a seal which is effective to maintain a pressure-tight joint, even when subjected to considerable variation in temperature. It is also among the objects of the invention to provide a composite gasket which is easily fabricated, one in which the component parts are effectively held together to withstand handling and transportation and one which requires a minimum of tools for its manufacture.

Further objects and advantages of the present invention will be apparent from the following description, reference being had to the accompanying drawings, wherein a preferred form of the present invention is clearly shown.

In the drawings:

Fig. 1 is a plan of one of the members of a composite gasket embodying my invention.

Fig. 2 is a section on the line 2—2 of Figure 1.

Fig. 3 is a plan on a reduced scale of an assembled gasket.

Fig. 4 is an elevation of a joint including my improved gasket.

Figs. 5, 6, 7 and 8 are fragmentary sectional views of the assembled joint, corresponding to the section on line 5—5 of Fig. 3 and drawn on a greatly enlarged scale, showing the gasket under a variety of conditions.

Figure 6:
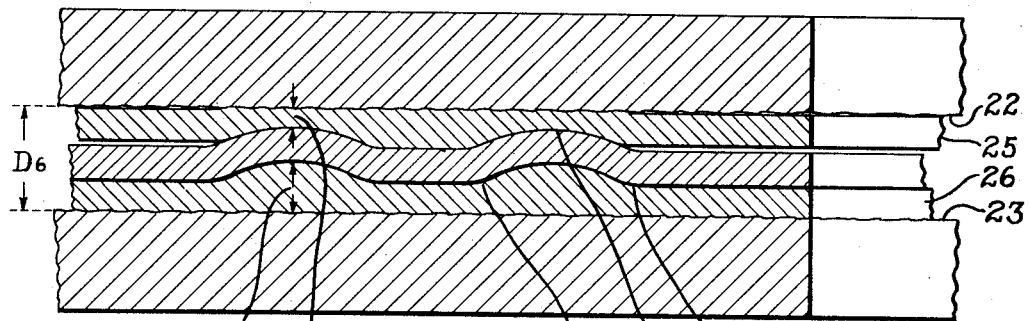

In the drawings, Figs. 4 and 5 illustrate the invention as embodied in a joint between a flanged conduit connection 20 and a casting 21, such as a cylinder head of a compressor. The bodies to be joined have generally flat opposed surfaces 22 and 23 and are held together by bolts or the like 24. The opposed surfaces need not be perfectly smooth, but as indicated in Figs. 5 to 8, may be what would be considered in this art as quite rough, for example the surfaces of forgings or of roughly machined castings. Adjacent each surface I place a layer 25 or 26 of relatively soft or plastic material, for example lead, or a soft alloy, and between the soft layers I place a layer 27 of elastic material, for example spring steel, phosphor bronze or the like. All of the layers are of the same general contour as the surfaces to be joined, as shown in Figs. 1 and 3.

Each layer has a principal opening 28 which registers with the conduit openings 29 in the members to be joined, and in the embodiment illustrated in Figs. 1 to 4, has a pair of additional principal openings 30 for the bolts. Each layer also has one or more secondary openings 31. The layers are symmetrical with reference to their principal openings and asymmetrical with reference to the secondary openings. The purpose of this arrangement is to facilitate assemblage and securing together of composite gasket using two identical plastic layers, which can be stamped by the same tool. In assembling the gasket, the elastic layer 27 and one plastic layer 25 are placed with their secondary openings in alignment, but the other plastic layer 26 is reversed with respect to these layers, so as to bring its secondary openings out of alignment and to present an imperforate surface opposite the secondary openings of the other layers. Fig. 3 shows the layers so assembled, the openings 31 shown in solid lines being those of layers 25 and 27 while the openings 31 shown in dotted lines are those of layer 26. After being so assembled, the layer 26 is punched thru the openings 31 in the layers 25 and 27, and may be riveted or crimped as shown at 32, to hold the gasket together. The crimped portion 32 does not interfere with the sealing or with clamping together the members to be joined, due to flow and/or bending of the crimped portion and/or the surrounding area of the sheet 25, upon being put under pressure, there being sufficient space between layers 25 and 26 within the height of the corrugations 40 of the elastic layer to permit such flow or bending.

In previous attempts to seal members by means of clamping a soft gasket between them it has been found that when the joint is tightened the surfaces are forced together and may squeeze out the soft gasket layer, making it appreciably thinner than it was before. If the joint thereafter becomes loose, the surfaces recede from each other and the gasket being thinner than it was before, it will not occupy all of the space between the members but will permit fluid to leak thru the joint. The condition above described may be produced by exposing the joint to a varying temperature, particularly if the joint includes one or more brass members held together by steel bolts, in which case the expansion of the joint on being heated will force the surfaces toward each other and the subsequent shrinking of the joint on being cooled will allow the surfaces to recede from each other. Therefore, a gasket composed of a layer of plastic material may not be satisfactory when used with devices which are subject to considerable variation in temperature. My invention overcomes the difficulties above described and maintains a tight seal under widely varying conditions of the joint.

The elastic layer is designed to form an elastic member between the plastic layers which always holds the plastic layers in sealing engagement with the surfaces 22 and 23 and also maintains sealing contact with the plastic layers themselves. To this end the elastic layer is provided with one or more corrugations 40 surrounding the opening to be sealed, and if desired, there may be additional corrugations 41 around the bolt holes.

Fig. 5 represents the joint assembled but before the bolts have been tightened. The plastic layers are lightly in contact with the elastic layer, but may be out of contact with either or both of the surfaces 22 and 23, which are a distance D5 apart.

Fig. 6 represents the joint after the bolts have been tightened to hold a given pressure, for example when the joint is cold. The surfaces are now a distance D6 apart, which is obviously less than D5, and the pressure of the bolts urging the surfaces toward one another has flattened the corrugations somewhat, deforming the plastic layers to conform to the corrugations, and pressing them firmly into the irregularities of the surfaces 22 and 23 at the points opposite the corrugations. Likewise the plastic layer has been compressed to a thickness T6 opposite the points 33 of the corrugations, and the gasket 26 has been upset to a thickness $t6$ between the heels 34 of the corrugations. Thus a tight seal is established between surfaces 22 and 23 in the region of the corrugations.

Figure 7:
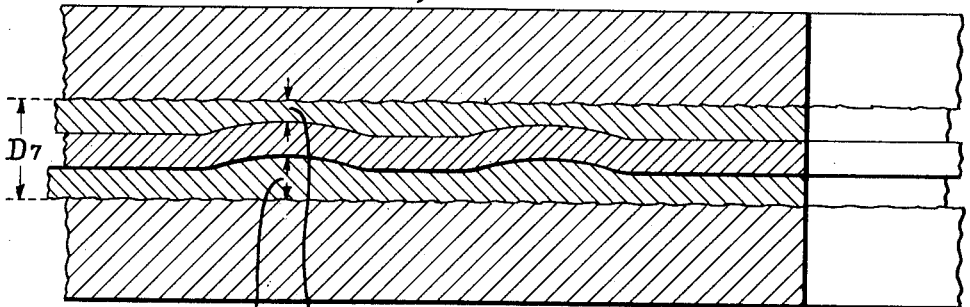

In Fig. 7 the joint is represented with the surfaces closer together than in Fig. 6, which condition may be effected, for example, by heating the joint, or by tightening the bolts. The surfaces are now a distance apart D7 which is less than D6, the corrugations have been flattened still more, and the plastic layers may be in sealing contact with the surface and the elastic layer at all points. Both the thickness T7 of the layer 25 above the points of the corrugations, and the thickness $t7$ of the layer 26 between the heels of the corrugations may now be less than T6 and $t6$ respectively.

Figure 8:
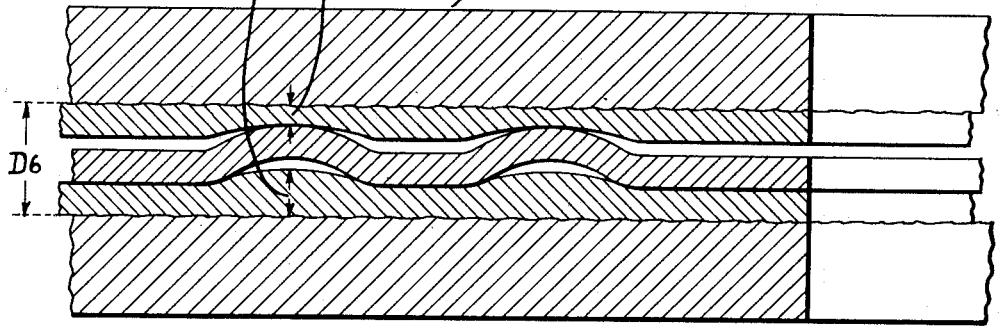

In Fig. 8 the joint has loosened, for instance by cooling, or loosening of the bolts, so that the surfaces are again a distance apart D6. As the surfaces recede from each other the elastic corrugations tend to assume their original shape as shown in Fig. 5, the points 33 following the layer 25 and the heels 34 following the layer 26. Thus, while the portions of the plastic layers adjacent the corrugations retain their reduced thicknesses T7 and $t7$, the corrugations take up the space left by the shrinking of the joint and urge these layers apart, maintaining them in sealing contact with the surfaces 22 and 23, and maintaining sealing contact between the elastic layer and the plastic layers. Each corrugation thus provides a continuous member surrounding the opening, always in sealing contact with both plastic layers, and always urging the plastic layers into sealing contact with the surfaces to be joined.

Upon subsequent heating and cooling, the plastic layers will retain the forms shown in Figs. 7 and 8 while the elastic layer will vary between the two forms shown.

Figure 9:
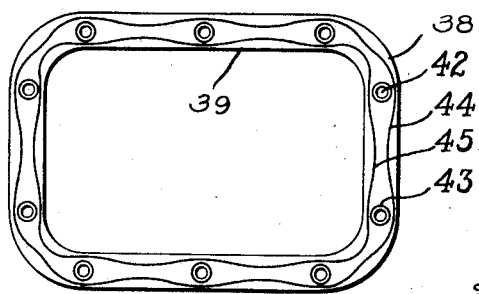
Fig. 9 is a plan view corresponding to Fig. 1 of one of the members of a modified form of gasket.

The particular form of gasket in Fig. 3 is especially adapted to join sections of conduits in which the principal opening 28 forms the passage for fluid. My invention is equally suitable to joining together any hollow bodies, such as cylinders and crankcases of engines and compressors. A form of gasket suitable for joining the cylinder to the crankcase of a compressor is shown in Fig. 9. This figure represents a plan view of the elastic member of such a gasket. In this figure the gasket 38 having a principal opening 39 has a plurality of bolt holes 42 each of which is surrounded by a corrugation 43. If desired, other corrugations 44 and 45 may be used to surround the entire group of bolt holes, thus providing additional protection against leakage.

While the form of embodiment of the invention as herein disclosed, constitutes a preferred form, it is to be understood that other forms might be adopted, all coming within the scope of the claims which follow.

What is claimed is as follows:

1. Means for sealing a joint between two surfaces comprising in combination a flat independent ply of plastic material in contact with one surface, and sheet metal spring means between said ply and the other surface, said sheet metal spring means having an annular corrugation, said corrugation being adapted to flex in one direction when the surfaces are moved together and to flex in the opposite direction and maintain sealing contact with the plastic ply when the surfaces are thereafter separated.

2. Means for sealing a joint between two surfaces comprising in combination a pair of flat independent plies of a plastic material, one of said plies being in contact with one of said surfaces and the other of said plies being in contact with the other of said surfaces, and sheet metal spring means between said plies, said sheet metal spring means having an annular corrugation therein, said corrugation being adapted to flex in one direction when said surfaces are moved together and to maintain sealing contact with the plastic ply when the surfaces are thereafter separated.

3. Means for sealing a joint between two surfaces comprising in combination, a layer of plastic material in contact with each surface, and a layer of elastic material between the plastic layers, the elastic layer and one of the plastic layers having aligned openings, and the other plastic layer being deformed to project through said openings and hold all of the layers together.

4. A composite gasket comprising a pair of relatively soft plane layers and a relatively hard corrugated layer between the soft layers, one of the soft layers having a portion bent over the other soft layer to hold all of the layers together, the height of the corrugation being equal to or greater than the thickness of said bent-over portion to provide space for receiving the bent-over portion within the normal thickness of the gasket.

In testimony whereof I hereto affix my signature.

OTTO M. SUMMERS.